US011273989B2

(12) United States Patent
Choe

(10) Patent No.: US 11,273,989 B2
(45) Date of Patent: Mar. 15, 2022

(54) CHAIN DRIVING SPROCKET FOR TROLLEY CONVEYORS

(71) Applicant: KOREA WHEEL CORPORATION, Boryeong-si (KR)

(72) Inventor: Hun Choe, Boryeong-si (KR)

(73) Assignee: KOREA WHEEL CORPORATION, Boryeong-si (KR)

( * ) Notice: Subject to any disclaimer, the term of this patent is extended or adjusted under 35 U.S.C. 154(b) by 0 days.

(21) Appl. No.: 17/182,855

(22) Filed: Feb. 23, 2021

(65) Prior Publication Data

US 2021/0292093 A1     Sep. 23, 2021

(30) Foreign Application Priority Data

Mar. 17, 2020   (KR) .................. 10-2020-0032335

(51) Int. Cl.
*B65G 23/06* (2006.01)
*F16H 55/30* (2006.01)

(52) U.S. Cl.
CPC ........... *B65G 23/06* (2013.01); *F16H 55/303* (2013.01); *B65G 2207/30* (2013.01)

(58) Field of Classification Search
CPC .... B65G 23/06; B65G 2207/30; F16H 55/303
(Continued)

(56) References Cited

U.S. PATENT DOCUMENTS 1,055,912 A * 3/1913 Houston ............... F16H 55/303
474/155

2,906,390 A * 9/1959 Hefti ..................... B65G 39/20
198/330
(Continued)

FOREIGN PATENT DOCUMENTS

GB       1076820 A      7/1967
KR     10-2157485       9/2020
(Continued)

OTHER PUBLICATIONS

International Search Report, PCT/KR2019/008581, dated Oct. 18, 2019 (4 pages).

*Primary Examiner* — James R Bidwell
(74) *Attorney, Agent, or Firm* — R. Reams Goodloe, Jr.

(57) ABSTRACT

A chain driving sprocket for a trolley conveyor. The chain drive sprocket includes a disc shaped central body, chain rings including a first sprocket ring and a second sprocket ring. The first sprocket ring and the second sprocket ring are each removably affixable to the disc shaped central body. The first and second sprocket rings are each provided with spaced apart teeth pairs having a curved surface therebetween, sized and shaped to receive a horizontal shaft in a vertical roller unit of the trolley conveyor, for driving the chain of a trolley conveyor. The disc shaped central body further includes curved rectangular shaped protrusions which extend radially outward on the circumferential surface of the disc shaped body. The chain rings are configured to be interchangeably coupled to each of the two sides of the disc shaped central body, thereby reducing manufacturing cost and reducing maintenance costs, since the chain rings may be replaced when the teeth pairs wear. Horizontal roller units are supported by protrusions, thereby improving stability and reducing noise generation.

20 Claims, 2 Drawing Sheets

(58) Field of Classification Search
USPC .......................................... 198/832, 834, 835
See application file for complete search history.

(56) References Cited

U.S. PATENT DOCUMENTS

| | | | |
|---|---|---|---|
| 3,074,356 A | 1/1963 | Parker et al. | |
| 3,590,745 A | 7/1971 | Ouska | |
| 3,762,535 A | 10/1973 | Becker et al. | |
| 4,598,812 A | 7/1986 | Grube | |
| 6,125,991 A | 10/2000 | Veldkamp et al. | |
| 6,386,355 B1 | 5/2002 | Willems | |
| 6,910,425 B2 | 6/2005 | Galpin | |
| 7,753,193 B2* | 7/2010 | Kanaris | B65G 23/06 198/834 |
| 2004/0084288 A1 | 5/2004 | Ashida et al. | |
| 2012/0073936 A1* | 3/2012 | Guldenfels | B08B 3/02 198/494 |
| 2013/0228421 A1* | 9/2013 | Harrelson | B65G 23/06 198/834 |
| 2013/0284569 A1 | 10/2013 | Studer | |
| 2017/0030453 A1* | 2/2017 | Young | F16H 55/30 |
| 2021/0127596 A1 | 5/2021 | Kim | |
| 2021/0127597 A1 | 5/2021 | Choe | |
| 2021/0130102 A1 | 5/2021 | Kim | |
| 2021/0131550 A1* | 5/2021 | Hall | F16D 1/0817 |
| 2021/0147154 A1 | 5/2021 | Choe | |

FOREIGN PATENT DOCUMENTS

| | | | | |
|---|---|---|---|---|
| WO | 2020/022649 | * | 1/2020 | ............. B65G 17/20 |
| WO | WO 2020/054958 A1 | | 3/2020 | |

\* cited by examiner

CHAIN DRIVING SPROCKET FOR TROLLEY CONVEYORS

COPYRIGHT RIGHTS IN THE DRAWING

A portion of the disclosure of this patent document contains material that is subject to copyright protection. The patent owner has no objection to the facsimile reproduction by anyone of the patent document or the patent disclosure, as it appears in the Patent and Trademark Office patent file or records, but otherwise reserves all copyright rights whatsoever.

STATEMENT OF GOVERNMENT INTEREST

Not Applicable.

RELATED PATENT APPLICATIONS

This application claims priority under 35 U.S. C. § 119 (a)-(e) based on Korean Patent Application No. 10-2020-0032335, by Hun CHOE, filed on Mar. 17, 2020, entitled Chain Driving Sprocket for Trolley Conveyor, which issued as Korean Patent No. 10-2157485 on Sep. 14, 2020, the disclosure of which is incorporated herein in its entirety, including the specification, claims, abstract, and drawing figures.

TECHNICAL FIELD

The invention(s) disclosed herein relate to a chain driving sprocket for driving a trolley conveyor in which vertical roller modules and horizontal roller modules are alternately arranged and flexibly connected to each other to provide a continuous trolley conveyor chain capable of navigating changes of direction in a trolley track in or on which the trolley conveyor chain travels.

BACKGROUND

In general, trolley conveyor chains used in trolley conveyors are driven by use of a driving sprocket which interacts with components of the trolley conveyor chain. Prior art sprockets for use in trolley conveyors have a configuration in which a plurality of teeth are formed on an outer surface of a main sprocket body in the form of a disc. When using such a design, a horizontal roller block is connected between vertical roller blocks to form a conveyor chain. The horizontal axles in the vertical roller blocks are engaged for firm meshing engagement with the teeth in the sprocket. The trolley conveyor chain moves according to the speed of rotation of the sprocket. An example of such a conventional chain drive sprocket for a trolley conveyor was disclosed as part of the conveyor chain used in the plant cultivation system using a trolley conveyor, disclosed in Korean Patent No. 10-2053997, registered Dec. 3, 2019. In that prior art design, a trolley conveyor chain structure is provided in which vertical roller blocks and horizontal roller blocks are alternately arranged and connected, and the sprocket is driven while the shaft connecting the vertical rollers on each side of the vertical roller block is engaged with the teeth on the outer circumference of the sprocket. However, in that prior art design, the horizontal roller blocks move around the sprocket without receiving any support. I have found that when the horizontal roller blocks are not supported, and the chain shifts vertically downward, the chain may be separated from the sprocket, as a result of the displacement of the horizontal roller block. Also, it is difficult to increase the conveying speed of the trolley conveyor when such problems are encountered. Additionally, there is a problem in that the vibration of the roller blocks increases, and as a result, the stability of transport deteriorates, and noise is generated.

Further, in the prior art design, the sprocket driving the chain portion of the trolley conveyor experiences excessive wear on teeth of the sprocket, since a load is applied on the teeth while the trolley conveyor chain continues to be pulled by the sprocket as the horizontal roller block sags. When sufficient wear has occurred, the entire prior art sprocket, as designed, has to be replaced. Consequently, there is an existing problem in that the burden of repair and maintenance cost is ongoing, due to the prior art sprocket design. Thus, there is an unmet need for a sprocket design which provides support for horizontal roller blocks which occur between vertical roller blocks, so that wear, tear, and noise can be reduced, and so that operational flexibility, i.e. speed adjustability, can be increased.

Some Objects, Advantages, and Novel Features

An object of the present invention is to reduce costs, by reducing the wear, tear, and maintenance problems of existing sprockets of conventional trolley conveyors, by providing a new sprocket design which provides support to horizontal roller blocks which are spaced between vertical roller blocks.

It is another object of the present invention to reduce noise and increase controllability as to conveyor chain speed, by use of protrusions on a sprocket disc to support horizontal roller blocks.

It is another object of the present invention to increase the stability of transport when adjusting conveyor chain speed, by use of protrusions on a sprocket disc to support horizontal roller blocks.

It is yet another object of the present invention to provide a sprocket design in which wear parts, namely teeth pairs which engage horizontal shafts connecting vertical rollers in vertical roller blocks for driving the trolley conveyor, can be easily replaced.

It is yet another object of the present invention to provide a repair kit for use in replacement of wear parts, namely teeth pairs which engage horizontal shafts connecting vertical rollers in vertical roller blocks for driving the trolley conveyor.

An object of the invention(s) disclosed herein is to solve the above-described problem of excessive repair and component replacement costs, by providing a new sprocket design that dramatically reduces labor costs for initial fabrication and for repair, yet can still be implemented to reliably perform the same function in a trolley conveyor system.

It is an advantage of the invention(s) disclosed herein that the cost of manufacturing a sprocket for a trolley chain is significantly reduced, as compared to prior art sprocket designs.

It is yet another advantage of the invention(s) disclosed herein that the reliability of the sprockets built according to the designs disclosed herein are improved, and that speed control and adjustments are more reliable.

The above objects and various advantages of the invention(s) as disclosed herein will become more apparent from the description provided and details of various embodiments, as will be understood by those skilled in the art.

SUMMARY

A novel multi-piece conveyor chain driving sprocket is provided. The conveyor chain driving sprocket is configured to drive a conveyor chain having alternating vertical roller units and horizontal roller units, where the vertical roller units each include a horizontal shaft which connects vertical rollers mounted on each side of a vertical roller unit, and where teeth pairs in the sprocket act on the horizontal shaft. The multi-piece sprocket includes (a) a disc shaped body, the disc shaped body having an obverse side, a reverse side, and a body portion between the obverse side and the reverse side, and a circumferential edge surface, (b) a first sprocket ring, the first sprocket ring removably affixed to the obverse side of the disc shaped body, and (c) a second sprocket ring, the second sprocket ring removably affixed to the reverse side of the disc shaped body. The first sprocket ring and the second sprocket ring each include a plurality of teeth pairs. Each of teeth pairs on the first sprocket ring and on the second sprocket ring have first and second teeth with a curved gap surface between the first and second teeth. The first and second teeth and the curved gap surface are sized and shaped for meshing engagement with a horizontal shaft connecting vertical rollers in a vertical roller unit.

The first sprocket ring and the second sprocket ring each have a thickness T, and are spaced apart by the disc shaped body by a distance D, so that the curved gap surface in each one of the plurality of teeth pairs extends a height H above the circumferential edge surface of the disc shaped body, so that a horizontal shaft connecting vertical rollers is exposed for aligned meshing engagement with companion teeth pairs on the first sprocket ring and on the second sprocket ring.

In an embodiment, the disc shaped body of the sprocket includes a plurality of protrusions spaced apart at intervals around the circumferential edge surface of the disc shaped body. Each one of the plurality of protrusions are circumferentially located for support of a vertical shaft connecting horizontal rollers mounted on each side of horizontal roller units, so as to support the horizontal rollers radially outward in the direction of distal ends of the teeth on the first sprocket ring and on the second sprocket ring. In an embodiment, each one of the plurality of protrusions is spaced equidistant between adjacent teeth pairs provided in the plurality of teeth pairs. In this design, the flow of horizontal roller units flows smoothly and evenly along the circumferential edge of the sprocket, even though, in an embodiment, the teeth of the sprocket do not engage the horizontal roller units. Such support reduces noise, and increases controllability of the linear velocity of the conveyor chain as it is urged along by the sprocket.

BRIEF DESCRIPTION OF THE DRAWING

The present invention(s) are described herein by way of exemplary embodiments, using for illustration the accompanying drawing in which like reference numerals denote like elements in the various figures of the drawing, and in which.

Figure 1:
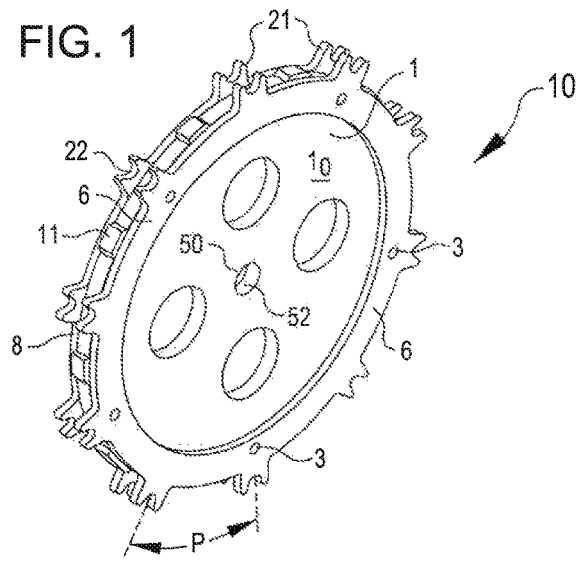
FIG. 1 is an exemplary perspective view of a chain driving sprocket for a trolley conveyor as described herein, showing an obverse side of a disc shaped body, the disc shaped body, and portions of a circumferential edge surface having protrusions thereon for support of horizontal roller units, as well as a first sprocket ring and a second sprocket ring, and also illustrating that the first sprocket ring and the second sprocket ring each include a plurality of teeth pairs.

The foregoing figures, being merely exemplary, contain various elements that may be present or omitted from a particular final configuration for an embodiment of a sprocket for driving a trolley conveyor chain. However, there is no intention to limit the claimed invention to dimensional data, and any suggestion provided by any of the drawing figures of this specification are exemplary rather than mandatory. Thus, the sprocket described and components may be used in similar configurations, or sized up or down from any dimensions depicted, without affecting the scope of the appended claims. An attempt has been made to draw the figures in a way that illustrates at least those elements that are significant for an understanding of exemplary sprocket design for a trolley conveyor system, and the particulars may be varied for specific situations.

It should be understood that various features may be utilized in accord with the teachings hereof, as may be useful in different embodiments, depending upon the specific requirements of a trolley conveyor system chain, all within the scope and coverage of the teachings herein as defined by the claims. Further, like features in various embodiments for a sprocket for use in a trolley conveyor system may be described using like reference numerals, or other like references, without further mention thereof.

DETAILED DESCRIPTION

Figure 2:
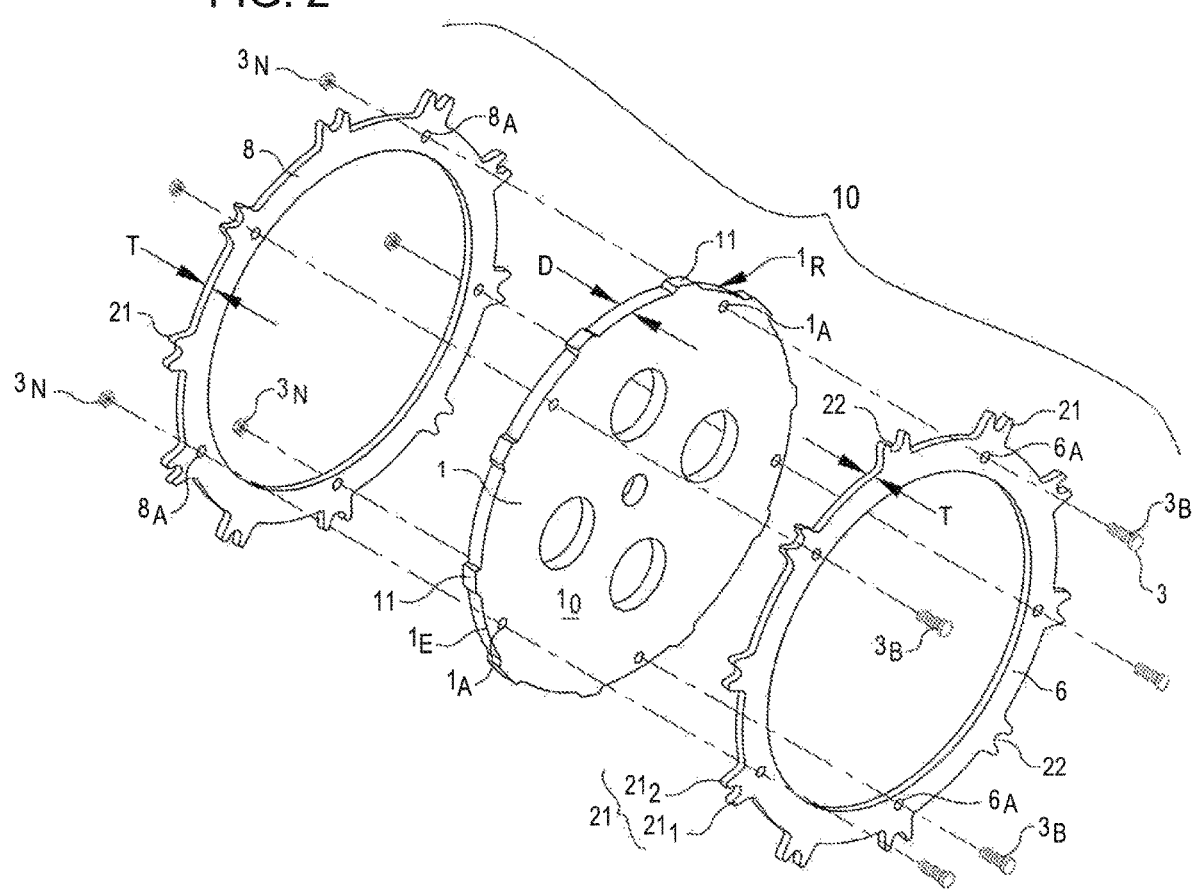
FIG. 2 is an exploded perspective view of the chain driving sprocket just illustrated in FIG. 1 above, again showing an obverse side of a disc shaped body, the disc shaped body, and portions of a circumferential edge surface having protrusions thereon for support of horizontal roller units, showing how a first sprocket ring and a second sprocket ring are removably affixed to the disc shaped body using a plurality of fasteners, and also illustrating that the first sprocket ring and the second sprocket ring each include a plurality of teeth pairs.

Attention is directed to FIG. 2, which provides an exploded perspective of a novel conveyor chain drive sprocket 10. A disc shaped body 1 is provided, having an obverse side $1_O$, a reverse side $1_R$, and a circumferential edge surface $1_E$. A first sprocket ring 6 and a second sprocket ring 8 are provided, each removably affixed to the disc shaped body 1. In an embodiment, the first sprocket ring 6 may be affixed to an obverse side $1_O$ to of the disc shaped body 1. The disc shaped body 1 may be a central body, located in an intermediate position between a first sprocket ring 6 and a second sprocket ring 8. In an embodiment, the second sprocket ring 8 may be affixed to a reverse side $1_R$ of the disc shaped body 1. In an embodiment, the first sprocket ring 6 and the second sprocket ring 8 may be identical, or at least interchangeable, and thus, the locations of each may be reversed.

Figure 3:
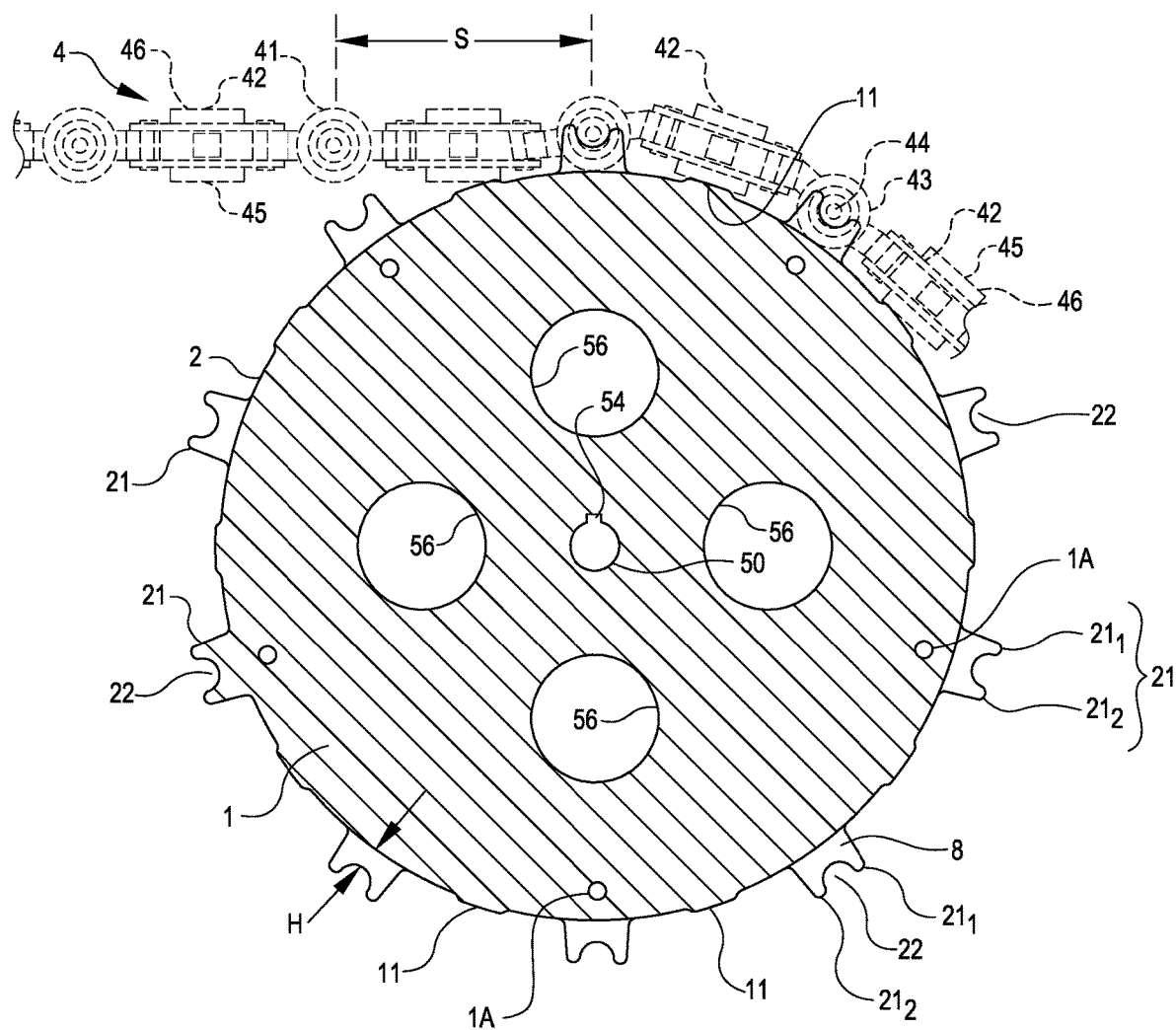
FIG. 3 is a vertical cross-sectional view of the chain driving sprocket for a trolley conveyor as shown in FIG. 1, the configuration of components when the sprocket is being used to drive the a trolley conveyor chain.

In FIG. 3, where a vertical cross-sectional view of the conveyor chain drive sprocket 10 is provided, showing the disc shaped body 1 in cross-section, the in-use configuration of the conveyor chain drive sprocket 10 can be appreciated as it is seen driving a conveyor chain 4 having alternating vertical roller units 41 and horizontal roller units 42. The vertical roller units 41 each include a horizontal shaft 44 which connects vertical rollers 43 mounted on each side of a vertical roller unit 41.

The first sprocket ring 6 and the second sprocket ring 8 each are provided with engaging portions in the form of a plurality of teeth pairs 21. The teeth pairs each have first teeth $21_1$ and second teeth $21_2$, and a groove therebetween provided by a curved gap surface 22. The first teeth $21_1$ and second teeth $21_2$ and the curved gap surface 22 are all sized and shaped for secure meshing engagement with the horizontal shaft 44 connecting vertical rollers 43. The horizontal shaft 44 connecting the vertical rollers 43, which are mounted on both sides of the vertical roller units 41, is supported by the curved gap surface 22 between teeth pairs 21. Consequently, the horizontal shaft portion 44 supporting the vertical rollers 43 for rotary motion is pulled by an engaging portion provided by a teeth pair 21 and a curved gap surface 22 therebetween, and which rotate but move in the same direction as the chain 4 being pulled, so that the entire chain 4 is moved.

The first sprocket ring 6 and the second sprocket ring 8 each have a thickness T, and are spaced apart by the disc shaped body by a distance D, and the curved gap surface extends a height H (see FIG. 3) above the circumferential edge surface $1_E$ of the disc shaped body 1. With this structure, a horizontal shaft 44 connecting vertical rollers 43 is exposed for aligned meshing engagement between companion teeth pairs 21, while securely fitting into the support structure provided by the curved gap surface 22.

In an embodiment, the disc shaped body 1 may further include a plurality of protrusions 11 directed outward in a radial direction and spaced apart at intervals around the circumferential edge surface $1_E$ of the disc shaped body 1. In an embodiment, each one of the plurality of protrusions 11 are circumferentially located for support of a vertical shaft 45 connecting horizontal rollers 46 mounted on each side of horizontal roller units 42. In an embodiment, each one of the plurality of protrusions 11 may be spaced equidistant between adjacent teeth pairs 21 provided in the plurality of teeth pairs 21. In an embodiment, each one of the plurality of protrusions 11 may be provided as a curved rectangular shape raised above the circumferential edge surface $1_E$ of the disc shaped body 1.

In various embodiments, a tooth pitch P is defined between adjacent teeth pairs 21, and the tooth pitch P is equal in length to a horizontal shaft pitch S defined between horizontal shafts 44 in adjacent vertical roller units 41. In this manner, the protrusions 11 are configured to support each vertical shaft 45, and thus maintain alignment between adjacent horizontal roller units 42 and vertical roller units 41, as they are pulled by the conveyor chain drive sprocket 10.

In an embodiment, each of the first sprocket ring 6 and the second sprocket ring 8 are removably affixed to the disc shaped body 1 with a plurality of separable fasteners 3. In an embodiment, the separable fasteners 3 may be provided in the form of a threaded bolt $3_B$ and complementary nut $3_N$.

As seen in each of the drawing figures, the disc shaped body 1 may further include a central drive shaft aperture 50 defined by interior sidewalls 52. The central drive shaft aperture 50 is sized and shaped for securely receiving therein a drive shaft (not shown) of complimentary size. In an embodiment, the central drive shaft aperture 50 may further include a key slot 54, which is configured to provide an interference fit between a keyed central drive shaft (not shown) and the disc shaped body 1. Additionally, apertures 56 may be provided to meet other objectives, such as structural, weight, manufacturing.

In an embodiment, a kit for building a conveyor chain drive sprocket 10 may be provided. In an embodiment, the kit may include a disc shaped body 1, a first sprocket ring 6, and a second sprocket ring 8. In an embodiment, the kit may omit the disc shaped body 1, and thus merely include a first sprocket ring 6, and a second sprocket ring 8, and optionally, fasteners 3. The disc shaped body 1 is configured to be interchangeably coupled with replacement chain rings, namely a replacement first sprocket ring 6, and a replacement second sprocket ring 8. Since the first sprocket ring 6, and second sprocket ring 8 may be easily produced from stamped metal fabrication, or pressing, both manufacturing cost and maintenance costs are reduced. Additionally, if necessary or cost effective in a particular situation, the first sprocket ring 6 and second sprocket ring 8 may be formed by powder metallurgy. Importantly, replacement of only the chain rings, namely first sprocket ring 6, and second sprocket ring 8, can be replaced after wear and tear, thus simplifying maintenance and reducing overall operating and maintenance costs.

The first sprocket ring 6 and the second sprocket ring 8 each are provided with engaging portions in the form of a plurality of teeth pairs 21. The teeth pairs each have first teeth $21_1$ and second teeth $21_2$, and a groove therebetween provided by a curved gap surface 22. The first teeth $21_1$ and second teeth $21_2$ and the curved gap surface 22 are all sized and shaped for secure meshing engagement with the horizontal shaft 44 connecting vertical rollers 43. In an embodiment, the kit may include a plurality of separable fasteners 3 for affixing the first sprocket ring 6 and the second sprocket ring 8 to the disc shaped body 1. In an embodiment, the separable fasteners 3 may be provided in the form of a threaded bolt $3_B$ and complementary nut $3_N$. In an embodiment, at least four separable fasteners 3 may be provided. In an embodiment, the disc shaped body 1 may include a plurality of protrusions 11 spaced equidistant circumferentially around the circumferential edge surface $1_E$, so that the protrusions 11 are spaced for support, during operation, of a vertical shaft 45 connecting horizontal rollers 46 mounted on each side of horizontal roller units 42. In an embodiment, each of the protrusions 11 may be provided as a curved rectangular shape raised above the circumferential edge surface $1_E$, of the disc shaped body 1, In an embodiment of the kit, a disc shaped body 1 may be provided with a central drive shaft aperture 50 sized and shaped for securely receiving therein a drive shaft (not shown) of complimentary size. In an embodiment of the kit, the disc shaped body 1 may further include a key slot 54 which is configured to provide an interference fit between a keyed central drive shaft (not shown) and the disc shaped body 1. In various embodiments, a tooth pitch P defined between adjacent teeth pairs 21 is equal in length to a horizontal shaft pitch S defined between horizontal shafts 44 in adjacent vertical roller units 41.

In an embodiment, the first sprocket ring 6 and the second sprocket ring 8 may each further include a plurality of fastener receiving apertures $6_A$, and $8_A$, respectively, defined by aperture sidewalls. Likewise, in embodiment, the disc shaped body 1 may further include a plurality of fastener receiving apertures $1_A$, defined by aperture sidewalls. Each one of the plurality of fastener receiving apertures $1_A$, $6_A$ and $8_A$ are sized and shaped to receive therethrough a fastener $3_B$ for complementary mating engagement. With this configuration, the first sprocket ring 6 and the second sprocket ring 8 may be configured for assembly to the disc shaped body 1.

Although only a few exemplary embodiments have been described in detail, various details are sufficiently set forth in the drawings and in the specification provided herein to enable one of ordinary skill in the art to make and use the invention(s), which need not be further described by additional writing in this detailed description. It will be readily apparent to those skilled in the art that the conveyor driving sprocket details as described herein may be useful in reducing costs of a trolley conveyor system, and as such may be modified from those embodiments provided herein, without materially departing from the novel teachings and advantages provided.

The aspects and embodiments described and claimed herein may be modified from those shown without materially departing from the novel teachings and advantages provided, and may be embodied in other specific forms without departing from the spirit or essential characteristics thereof. Therefore, the embodiments presented herein are to be considered in all respects as illustrative and not restrictive. As such, this disclosure is intended to cover the structures described herein and not only structural equivalents thereof, but also equivalent structures. Numerous modifications and variations are possible in light of the above teachings. It is therefore to be understood that within the scope of the appended claims, the invention(s) may be practiced otherwise than as specifically described herein. Thus, the scope of the invention(s), as set forth in the appended claims, and as indicated by the drawing and by the foregoing description, is intended to include variations from the embodiments provided which are nevertheless described by the broad interpretation and range properly afforded to the plain meaning of the claims set forth below.

The invention claimed is:

1. A conveyor chain drive sprocket, the conveyor chain drive sprocket configured to drive a conveyor chain having alternating vertical roller units and horizontal roller units, the vertical roller units each including a horizontal shaft which connects vertical rollers mounted on each side of a vertical roller unit, the conveyor chain drive sprocket comprising:
    a disc shaped body, the disc shaped body having an obverse side, a reverse side, and a circumferential edge surface;
    a first sprocket ring, the first sprocket ring removably affixed to the obverse side of the disc shaped body;
    a second sprocket ring, the second sprocket ring removably affixed to the reverse side of the disc shaped body;
    wherein the first sprocket ring and the second sprocket ring each comprise a plurality of teeth pairs, the teeth pairs each comprising first and second teeth having a curved gap surface therebetween, the first and second teeth and the curved gap surface sized and shaped for meshing engagement with a horizontal shaft connecting vertical rollers; and
    wherein the first sprocket ring and the second sprocket ring each have a thickness T, and are spaced apart by the disc shaped body by a distance D, and wherein the curved gap surface extends a height H above the circumferential edge surface of the disc shaped body, so that a horizontal shaft connecting vertical rollers is exposed for aligned meshing engagement with companion teeth pairs on the first sprocket ring and on the second sprocket ring.

2. A conveyor chain drive sprocket as set forth in claim 1, wherein the disc shaped body further comprises a plurality of protrusions directed outward in a radial direction and spaced apart at intervals around the circumferential edge surface of the disc shaped body, wherein each one of the plurality of protrusions are circumferentially located for support of a vertical shaft connecting horizontal rollers mounted on each side of horizontal roller units.

3. A conveyor chain drive sprocket as set forth in claim 2, wherein each one of the plurality of protrusions is spaced equidistant between adjacent teeth pairs provided in the plurality of teeth pairs.

4. A conveyor chain drive sprocket as set forth in claim 3, wherein each one of the plurality of protrusions comprises a curved rectangular shape raised above the circumferential edge surface of the disc shaped body.

5. A conveyor chain drive sprocket as set forth in claim 1, wherein the disc shaped body further comprises a central drive shaft aperture, the central drive shaft aperture sized and shaped for securely receiving therein a drive shaft of complimentary size.

6. A conveyor chain drive sprocket as set forth in claim 5, wherein the central drive shaft aperture further comprises a key slot, the key slot configured to provide an interference fit between a keyed central drive shaft and the disc shaped body.

7. A conveyor chain drive sprocket as set forth in claim 1, wherein a tooth pitch P defined between adjacent teeth pairs is equal in length to a horizontal shaft pitch S defined between shafts in adjacent vertical roller units.

8. A conveyor chain drive sprocket as set forth in claim 1, wherein the first sprocket ring and the second sprocket ring are removably affixed to the disc shaped body with a plurality of separable fasteners.

9. The conveyor chain drive sprocket as set forth in claim 8, wherein the separable fasteners comprise a threaded bolt and complementary nut.

10. A kit for building a conveyor chain drive sprocket, the conveyor chain drive sprocket configured to drive a conveyor chain having alternating vertical roller units and horizontal roller units, the vertical roller units each including a horizontal shaft which connects vertical rollers mounted on each side of a vertical roller unit, the kit for building a conveyor chain drive sprocket comprising:
    a disc shaped body, the disc shaped body having an obverse side, a reverse side, and a circumferential edge surface;
    a first sprocket ring, the first sprocket ring removably affixable to the obverse side of the disc shaped body;
    a second sprocket ring, the second sprocket ring removably affixable to the reverse side of the disc shaped body;
    wherein the first sprocket ring and the second sprocket ring each comprise a plurality of teeth pairs, the teeth pairs each comprising first and second teeth having a curved gap surface therebetween, the first and second teeth and the curved gap surface sized and shaped for meshing engagement with a horizontal shaft connecting vertical rollers; and
    wherein the first sprocket ring and the second sprocket ring each have a thickness T, and when assembled are spaced apart by the disc shaped body by a distance D, so that the curved gap surface extends a height H above the circumferential edge surface of the disc shaped body, so that when assembled, a horizontal shaft connecting vertical rollers is exposed for aligned meshing engagement with companion teeth pairs on the first sprocket ring and on the second sprocket ring.

11. A kit for a conveyor chain drive sprocket as set forth in claim 10, wherein the disc shaped body further comprises a plurality of radially outward protrusions spaced apart at intervals around the circumferential edge surface of the disc shaped body, wherein the protrusions are spaced for support, during operation, of a vertical shaft connecting horizontal rollers mounted on each side of horizontal roller units.

12. A kit for a conveyor chain drive sprocket as set forth in claim 11, wherein each one of the plurality of protrusions is spaced equidistant between adjacent teeth pairs provided in the plurality of teeth pairs.

13. A kit for a conveyor chain drive sprocket as set forth in claim 12, wherein each one of the plurality of protrusions comprises a curved rectangular shape raised above the circumferential edge surface of the disc shaped body.

14. A kit for a conveyor chain drive sprocket as set forth in claim 13, wherein the disc shaped body further comprises a central drive shaft aperture, the central drive shaft aperture sized and shaped for securely receiving therein a drive shaft of complimentary size.

15. A kit for a conveyor chain drive sprocket as set forth in claim 14, wherein the central drive shaft aperture further comprises a key slot, the key slot configured to provide an interference fit between a keyed central drive shaft and the disc shaped body.

16. A kit for a conveyor chain drive sprocket as set forth in claim 15, wherein a tooth pitch P defined between adjacent teeth pairs is equal in length to a horizontal shaft pitch S defined between shafts in adjacent vertical roller units.

17. A kit for a conveyor chain drive sprocket as set forth in claim 16, further comprising a plurality of separable fasteners, and wherein the disc shaped body, the first sprocket ring, and the second sprocket ring each further comprise a plurality of fastener receiving apertures defined by aperture sidewalls, wherein each one of the plurality of fastener receiving apertures are sized and shaped to receive therethrough a fastener of complementary mating engagement, and wherein the first sprocket ring and the second sprocket ring are configured for assembly with the disc shaped body using the a plurality of separable fasteners.

18. The kit for a conveyor chain drive sprocket as set forth in claim 17, wherein the separable fasteners comprise a threaded bolt and complementary nut.

19. The kit for a conveyor chain drive sprocket as set forth in claim 18, wherein at least four fasteners are provided.

20. A kit for repair of a conveyor chain drive sprocket, the conveyor chain drive sprocket configured to drive a conveyor chain having alternating vertical roller units and horizontal roller units, the vertical roller units each including a horizontal shaft which connects vertical rollers mounted on each side of a vertical roller unit, and wherein the conveyor chain drive sprocket comprises a disc shaped body having an obverse side and a reverse side, wherein the kit for repair of a conveyor chain drive sprocket comprises:

a first sprocket ring, the first sprocket ring removably affixable to the obverse side of the disc shaped body;

a second sprocket ring, the second sprocket ring removably affixable to the reverse side of the disc shaped body;

wherein the first sprocket ring and the second sprocket ring each comprise a plurality of teeth pairs, each of the teeth pairs on the first sprocket ring and on the second sprocket ring comprising first and second teeth having a curved gap surface therebetween, the first and second teeth and the curved gap surface sized and shaped for meshing engagement with a horizontal shaft connecting vertical rollers; and wherein the first sprocket ring and the second sprocket ring each are configured so that the curved gap surface extends a height H above a circumferential edge surface of a disc shaped body, so that a horizontal shaft connecting vertical rollers is exposed for aligned meshing engagement with companion teeth pairs on the first sprocket ring and on the second sprocket ring.

* * * * *